May 26, 1953  E. R. COUDEN  2,639,959
DISPENSER FOR DISKS, PADS, GASKETS, AND
SHEET-LIKE MEMBERS
Filed March 15, 1949  2 Sheets-Sheet 2
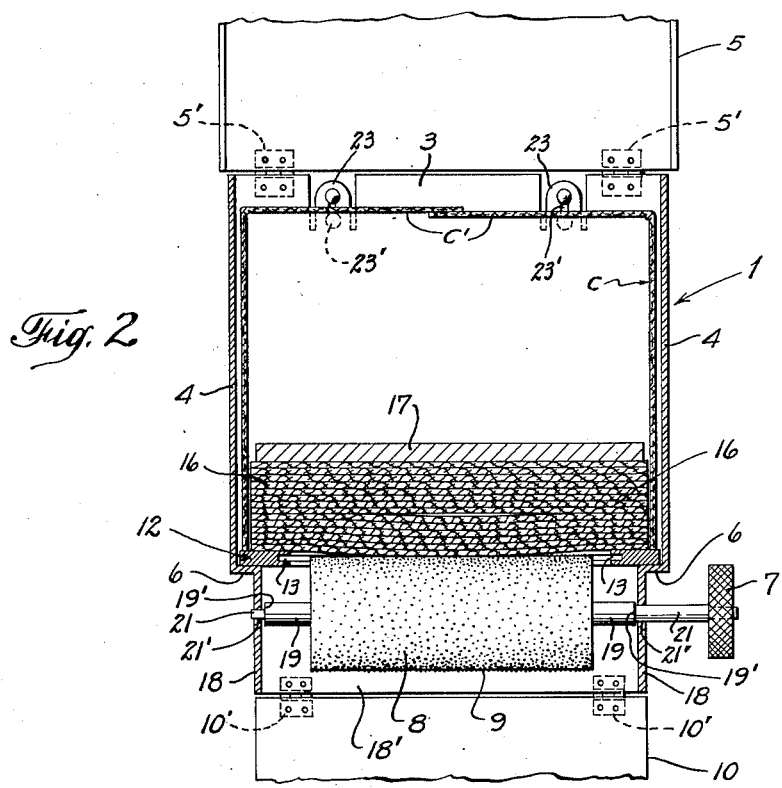
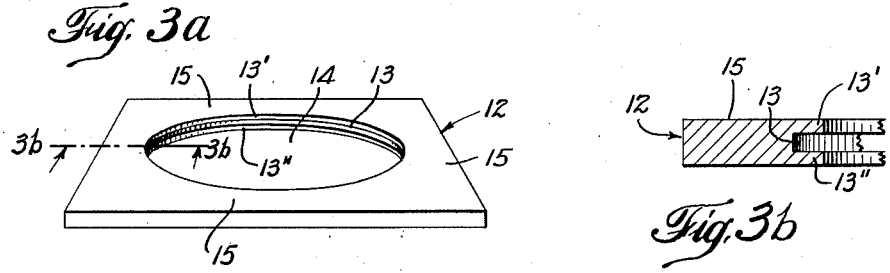
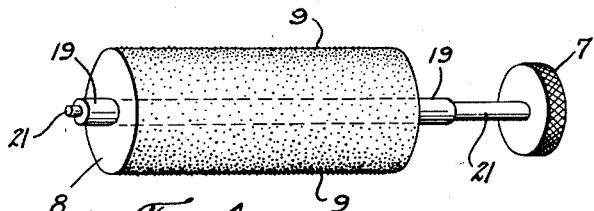
INVENTOR.
EARL R. COUDEN
BY
Rueben T. Carlson
ATTORNEY Patented May 26, 1953

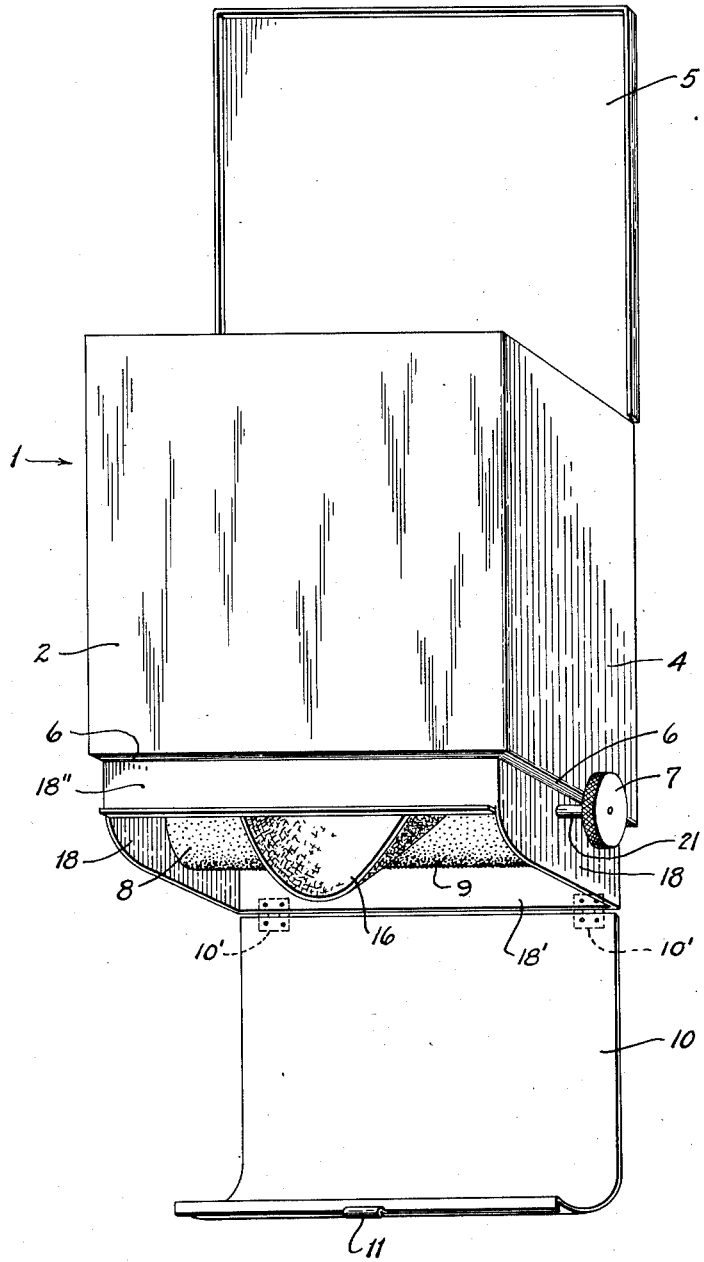

2,639,959

UNITED STATES PATENT OFFICE 2,639,959

DISPENSER FOR DISKS, PADS, GASKETS, AND SHEETLIKE MEMBERS

Earl R. Couden, Chicago, Ill., assignor to Beaverite Products, Inc., Beaver Falls, N. Y., a corporation of New York Application March 15, 1949, Serial No. 81,536

11 Claims. (Cl. 312—54)

My invention relates generally to a dispenser for delivering disks, pads and gaskets one at a time in a semiautomatic manner in a sanitary fashion, and more particularly to a dispenser for filter disks used by the dairy industry in conditioning milk and cream.

Filter disks are made in a variety of sizes and of different materials. They are difficult to handle and use for they are flexible, thin and of delicate construction and have a natural tendency to cling together, making it difficult to pick up a single disk for use in the filtering apparatus without touching or handling several additional filter disks not needed for immediate use. These filter disks are generally sold commercially in sanitary packages of 100 disks although only one disk is needed at a time in the filtering process. The current general practice is to remove several of these disks which cling together, and separate one for immediate use. The ones not needed are returned to the carton or scattered nearby. This practice results in the filter disks becoming soiled and unsanitary.

Dispensers made in accordance with my invention permit retention of the disks in their original container, clean and sanitary, and dispense only one at a time as needed for immediate usage. In this manner the supply of disks for future needs is not touched or handled in any way, resulting in a cleaner filtering operation in conformity with health regulations and sanitary requirements. The delicate surface of the disk is not marred or damaged when delivered by my dispenser so that the disk retains its designed size, shape, and consistency to accomplish its filtering purpose.

While my dispenser is primarily designed to dispense filter disks for the dairy industry and while such use is exemplified in the following description and drawings, I do not mean to restrict the usefulness of my invention to such purpose. My invention may be used in many other circumstances to dispense in an easy, sanitary fashion individual units or groups of units made of a substance or material where the units have a natural tendency to cling together or are difficult to handle.

Referring to the accompanying drawings, my invention is illustrated by way of exemplification in connection with the dispensing of filter disks for use in the filtering apparatuses used by the dairy industry, in which:

Figure 1 is a perspective view of my dispenser in complete form showing its method of operation;

Figure 2 is a vertical sectional view of Figure 1 taken in front of the dispensing or pull-out roller;

Figure 3a is a perspective view of the separator plate, shown in section in Figure 2, having a recessed groove formed within the margin of the discharge opening therein to prevent more than one disk from being dispensed at a time;

Figure 3b is an enlarged fragmentary sectional view taken along line 3b—3b of Figure 3a showing in more detail the recessed groove in the separator plate;

Figure 4 is a perspective view of the dispensing or pull-out roller and operating knob showing the rough surface of the dispensing or pull-out roller, here shown as solid but which may be sectional.

Since filter disks used in the filtering apparatuses of the dairy industry are usually made of soft cloth or fiber material, I have chosen to illustrate my invention as used to dispense disks of this particular type. However in so illustrating, I do not desire or intend to limit the use and design of my invention to this sole purpose for it can be readily varied or adapted for use in dispensing disks, pads or gaskets of other types designed for other uses.

The particular illustrated embodiment of my invention consists of a container magazine 1 which may be made of light sheet material of rectangular form to present a front wall panel 2, a rear wall panel 3 and side wall panels 4. The magazine is open at its base and may have a top cover or lid 5 hinged to the upper edge of the rear panel 3 of the container magazine 1. Equidistant from its two side panels 4, as shown in Fig. 2, are two offset tongues 23 which may be struck out from the rear panel 3 and pierced with a hole 23' by means of which the dispenser may be suspended from wall hooks so as to be easily removed therefrom and re-suspended thereon.

At the base of the container magazine 1 is a pair of inset side shoulders 6 extending inwardly from the lower edge of the side panels 4. A pair of side wall extensions 18 extend downwardly from the inner edges of the inset shoulder 6, the side extensions 18 being joined by a rear wall extension 18' and a front lip extension 18'' of reduced height as shown in Figs. 1 and 2, thereby providing a protecting housing for a dispensing roller 8. The inset side shoulders 6 provide a supporting base at the lower open end of the magazine 1 upon which a separator plate 12 may rest and be supported.

As shown in Figs. 1, 2 and 4, the dispensing roller 8 is fixed to an axial shaft 19 having reduced neck portions 21 at the ends thereof. The dispensing roller 8 is mounted to rotate within the housing by the provision of aligned holes 21' in the side wall extensions 18 which receive and provide bearing support for the reduced neck portions 21 of the roller shaft. A bottom closure cover 10 is hinged as by hinges 10' to the lower edge of the rear wall extensions 18' of the housing. When closed, the bottom closure cover 10 serves to protect the dispensing roller 8 and filter disks 16 from dirt and foreign matter when not in use. The front edge of the closure cover may be provided with a spring catch 11 designed to grip the lower edge of the front lip extension 18'' to hold the cover closed. The roller shaft 19 has end abutment portions 19' which are located directly adjacent the inside faces of the side wall extensions 18 to maintain the roller 8 in proper operative position and thereby prevent substantial side shifting thereof when operated.

The dispensing or pull-out roller 8 may be made from a cylindrical piece of wood having a roughened or abrasive covered surface 9. The dispensing or pull-out roller 8 may be maintained in fixed position on the roller shaft 19 by a drive-fit. The separator plate 12 has a generally circular discharge opening 14 centrally thereof which is defined by a surrounding margin 15 providing support for the stack of flexible filter disks 16 contained within the magazine 1. The upper arc of the dispensing roller 8 fits into the central opening 14 of the separator plate 12 so that the roughened surface 9 of the dispensing roller 8 comes into contact with the unsupported central portion of the lowermost filter disk 16 to be dispensed. The dispensing or pull-out roller 8 is shown in Fig. 4 as solid, but may be made sectional if so needed or desired for a particular use.

An operating knob 7 is fixed to the right hand extension 21 of the roller shaft 19 and is positioned outside the adjacent side wall extension 18 of the roller housing for conveniently revolving or turning the dispensing or pull-out roller 8.

The separator plate 12, whose margin 15 rests on the inset shoulders 6 of the magazine 1 and supports the stack of filter disks 16, may be made of a thin rectangular piece of "masonite" (as used in this embodiment but not restricted to such material) cut to fit tightly within the enclosing panels 2, 3 and 4 of the magazine 1. The circular dispensing opening of the separator plate 12 is cut out proportionately smaller (in this illustration ½ inch) than the size of the filter disks 16 to be dispensed, so that the margin 15 of the separator plate 12 provides adequate support for the filter disks 16 and prevents their sagging through this opening 14. The separator plate 12 has a groove or recess 13 in the circular wall of the discharge opening 14, so that the groove defines upper and lower lip portions 13' and 13''. This separator plate 12 is made to the thickness requisite to having the grooved recess 13 of a slightly larger thickness than the filter disks 16 to be dispensed.

Within the magazine 1 is placed a properly sized follow weight 17. This follow weight 17 is cut slightly smaller than the inner cross-sectional area of the magazine 1 so that it will fit on top of the stack of filter disks 16 within the original carton c in which they are purchased. The follow weight 17 is designed to maintain the lowermost filter disk 16 pressed lightly against the supporting margin 15 of the separator plate 12 as the supply of filter disks 16 is successively dispensed. The follow weight must be properly weighted to cause a slight sag in the lowermost filter disk without being so heavy as to cause the filter disks to become so compact that the dispensing mechanism cannot operate.

In explaining the operation of my invention above described, I have chosen to illustrate its use in dispensing circular filter disks used in the filtering apparatuses of the dairy industry. The most common of these filter disks are 6½ inches in diameter and are packaged commercially in cardboard cartons of 100 filter disks.

The first phase in the use of my invention is the filling of the container magazine 1 with the disks to be dispensed. To do so, the top of the cardboard carton c of the packaged disks is removed or folded down and the magazine is then inverted over the package of disks so that the top disk in the carton is seated against the margin 15 of the separator plate 12, with the dispensing or pull-out roller 8 bearing thereagainst. The magazine 1 is then restored to its upright position. Since my dispenser is portable for ease in filling and operating, it may be operated from any upright position where there is sufficient clear space below it to allow the operator to turn the operating knob 7 and to allow the dispensing roller 8 to rotate and dispense a filter disk. Thus the magazine 1 may be loaded with filter disks without the operator having touched or handled the disks themselves, since the magazine is designed to accommodate the commercial carton in which the disks are supplied to the user.

The bottom c' of the disk containing carton c, now at the top of the magazine 1 as shown in Fig. 2, is then opened or removed and the follow weight 17 is inserted on top of the stack of filter disks 16. The follow weight 17 serves to lightly press the lowermost filter disk 16 against the dispensing or pull-out roller 8. The hinged lid 5 is then lowered to close the upper end of the container magazine 1 and keeps the supply of filter disks clean and uncontaminated.

My dispenser is then ready to operate. The hinged bottom cover 10 is opened so that the operator may remove the lowermost filter disk 16 as it is dispensed. The operator then turns the operating knob 7 approximately one-half revolution towards the rear panel 3 or clockwise, and then approximately one-half revolution towards the front panel 2 or counterclockwise. This causes a single filter disk 16 to be projected by the dispensing or pull-out roller 8 below the front lip extension 18'' as shown in Fig. 1.

When the operating knob 7 is turned one-half revolution clockwise, it turns the roller shaft 19 and the dispensing or pull-out roller 8 also clockwise, thereby causing the dispensing or pull-out roller 8 to lightly grip or engage the bottom surface of the lowermost filter disk 16 of the filter disk stack in the container magazine 1 without in any way marring the surface of the disk. As the clockwise movement is continued, the lowermost filter disk 16 to be dispensed is pulled free from the superimposed supply of filter disks 16, drawn partially down through the dispensing opening of the separator plate 12, and follows the dispensing roller 8 to which it adheres towards the rear panel 3 of the magazine 1.

As the lowermost filter disk 16 to be dispensed is drawn down through the separator plate 12, the filter disk immediately above also starts down through the discharge opening 14 as heretofore explained, since the filter disks have a natural tendency to cling together. As the next following filter disk starts down through the discharge opening 14 of the separator plate 12, its edge slips into the recessed groove 13 of the separator plate 12 and is held between the upper and lower lip portions 13' and 13'' of the groove, thereby counteracting its tendency to cling to the lowermost filter disk 16 being dispensed and preventing it from continuing down through the discharge opening 14 of the separator plate 12 and also being dispensed. The separator plate 12 with its recessed groove 13 thus insures that only one filter disk will be dispensed at a time.

After the clockwise rotation of the operating knob 7 and the dispensing or pull-out roller 8 has pulled the lowermost filter disk 16 free from the superimposed filter disks, the counterclockwise rotation of about one-half revolution of the operating knob 7 and the dispensing or pull-out roller 8 causes the front edge of the lowermost filter disk to be driven forwardly and downwardly below the front lip extension 18'' of the roller housing as shown in Fig. 1, at which position it may be readily grasped by the operator.

While I have illustrated my invention and described its operation by means of a particular embodiment for use with a particular type of disk, I do not intend or wish to be understood as intending to thereby limit my invention to the particular use and embodiment above described, for my invention may be modified or varied in its size, shape and construction to dispense other types of disks, pads or gaskets without departing from the spirit of the invention.

I claim the following as new and desire to secure them by Letters Patent:

1. A dispenser for individually and separately dispensing flexible sheet-like members which have a tendency to cling together when stacked, said dispenser including a supply magazine adapted to enclose a stacked supply of said sheet-like members to be separately dispensed, a separator plate contained and supported within the lower end portion of said magazine, said separator plate having a marginal portion designed to support the stacked sheet-like members within the magazine and a central opening through which the successive lowermost sheet-like members are discharged from the magazine, said discharge opening in the separator plate being proportionately smaller than the size of the sheet-like members to be dispensed, discharge mechanism including gripping means extending into the discharge opening of the separator plate and positioned to grip the under surface of the lowermost sheet-like member in the magazine, and means for manipulating said gripping means to effect release and discharge of the lowermost sheet-like member from said discharge opening, said separator plate having means formed around the inner edge of the discharge opening thereof operative to retain the immediately superimposed sheet-like member within the magazine during forcible withdrawal of the lowermost sheet-like member through the discharge opening in the separator plate.

2. A dispenser for individually and separately dispensing flexible sheet-like members which have a tendency to cling together when stacked, said dispenser including a supply magazine adapted to enclose a stacked supply of said sheet-like members to be separately dispensed, a separator plate contained and supported within the lower portion of said magazine, said separator plate having a marginal portion designed to support the stacked sheet-like members within the magazine and a central opening through which the successive lowermost sheet-like members are discharged from the magazine, said discharge opening in the separator plate being proportionately smaller than the size of the sheet-like members to be dispensed, a withdrawal roller having a roughened gripping surface, means for rotatably supporting said discharge roller with the upper arcuate portion thereof extending into the discharge opening of the separator plate and in position to grip the under surface of the lowermost sheet-like member in the magazine, means for rotating said discharge roller clockwise and counterclockwise to effect release and discharge of the lowermost sheet-like member from said discharge opening, said separator plate having means formed around the inner edge of the discharge opening thereof operative to retain the immediately superimposed sheet-like member within the magazine during forcible withdrawal of the lowermost sheet-like member through the discharge opening in the separator plate.

3. A dispenser for individually and separately dispensing flexible sheet-like members which have a tendency to cling together when stacked, said dispenser including a supply magazine adapted to enclose a stacked supply of said sheet-like members to be separately dispensed, a separator plate supported within the lower portion of said magazine, said separator plate having a marginal portion designed to support the stacked sheet-like members within the magazine and a central opening through which the successive lowermost sheet-like members are discharged from the magazine, said discharge opening in the separator plate being proportionately smaller than the size of the sheet-like members to be dispensed, discharge mechanism including gripping means extending into the discharge opening of the separator plate and positioned to grip the under surface of the lowermost sheet-like member in the magazine, means for manipulating said gripping means to effect release and discharge of the lowermost sheet-like member from said discharge opening, said separator plate having a depressed inwardly extending lip portion formed around the inner edge of the discharge opening thereof operative to retain the immediately superimposed sheet-like member within the magazine during forcible withdrawal of the lowermost sheet-like member through the discharge opening in the separator plate.

4. A dispenser for individually and separately dispensing flexible sheet-like members which have a tendency to cling together when stacked, said dispenser including a supply magazine adapted to enclose a stacked supply of said sheet-like members to be separately dispensed, a separator plate supported within the lower portion of said magazine, said separator plate having a marginal portion designed to support the stacked sheet-like members within the magazine and a central opening through which the successive lowermost sheet-like members are discharged from the magazine, said discharge opening in the separator plate being proportionately smaller than the size of the sheet-like members to be dispensed, discharge mechanism including gripping means extending into the discharge opening of the separator plate and positioned to grip the under surface of the lowermost sheet-like member in the magazine, means for manipulating said gripping means to effect release and discharge of the lowermost sheet-like member from said discharge opening, said separator plate having a groove formed around the inner edge of the discharge opening thereof which defines upper and lower inwardly extending lip portions operative to retain the immediately superimposed sheet-like member within the magazine during forcible withdrawal of the lowermost sheet-like member through the discharge opening in the separator plate.

5. A dispenser for individually and separately dispensing flexible sheet-like members which have a tendency to cling together when stacked, said dispenser including a magazine adapted to enclose a stacked supply of said sheet-like members to be separately dispensed, said supply magazine having inset shoulder portions extending inwardly adjacent the bottom end thereof, a separator plate contained within said magazine and designed to be supported upon said inset shoulder portions, said separator plate having a marginal portion designed to support the stacked sheet-like members within the magazine and a central opening through which the successive lowermost sheet-like members are discharged from the magazine, said discharge opening in the separator plate being proportionately smaller than the size of the sheet-like members to be dispensed, discharge mechanism including gripping means extending into the discharge opening of the separator plate and positioned to grip the under surface of the lowermost sheet-like member, means for manipulating said gripping means to effect release and discharge of the lowermost sheet-like member from said discharge opening, said separator plate having means formed around the inner edge of the discharge opening thereof operative to retain the immediately superimposed sheet-like member within the magazine during forcible withdrawal of the lowermost sheet-like member through the discharge opening in the separator plate.

6. A dispenser for individually and separately dispensing flexible sheet-like members which have a tendency to cling together when stacked, said dispenser including a supply magazine adapted to enclose a stacked supply of said sheet-like members to be separately dispensed, said supply magazine having inset shoulder portions extending inwardly adjacent the bottom end thereof, a separator plate contained within said magazine and designed to be supported upon said inset shoulder portions, said separator plate having a marginal portion designed to support the stacked sheet-like members within the magazine and a central opening through which the successive lowermost sheet-like members are discharged from the magazine, said discharge opening in the separator plate being proportionately smaller than the size of the sheet-like members to be dispensed, a withdrawal roller having a roughened gripping surface, means for rotatably supporting said discharge roller with the upper arcuate portion thereof extending into the discharge opening of the separator plate and in position to grip the under surface of the lowermost sheet-like member, means for rotating said discharge roller clockwise and counterclockwise to effect release and discharge of the lowermost sheet-like member from said discharge opening, said separator plate having a depressed inwardly extending lip portion formed around the inner edge of the discharge opening thereof operative to retain the immediately superimposed sheet-like member within the magazine during forcible withdrawal of the lowermost sheet-like member through the discharge opening in the separator plate.

7. A dispenser for individually and separately dispensing flexible sheet-like members which have a tendency to cling together when stacked, said dispenser including a supply magazine adapted to enclose a stacked supply of said sheet-like members to be separately dispensed, said supply magazine having inset shoulder portions extending inwardly adjacent the bottom end thereof, a separator plate contained within said magazine and designed to be supported upon said inset shoulder portions, said separator plate having a marginal portion designed to support the stacked sheet-like members within the magazine and a central opening through which the successive lowermost sheet-like members are discharged from the magazine, said discharge opening in the separator plate being proportionately smaller than the size of the sheet-like members to be dispensed, a withdrawal roller having a roughened gripping surface, means for rotatably supporting said discharge roller with the upper arcuate portion thereof extending into the discharge opening of the separator plate and in position to grip the under surface of the lowermost sheet-like member, means for rotating said discharge roller clockwise and counterclockwise to effect release and discharge of the lowermost sheet-like member from said discharge opening, said separator plate having a groove formed around the inner edge of the discharge opening thereof which defines upper and lower inwardly extending lip portions operative to retain the immediately superimposed sheet-like member within the magazine during forcible withdrawal of the lowermost sheet-like member through the discharge opening in the separator plate.

8. Sanitary dispensing mechanism for dispensing disklike members in the form of disks, pads or gaskets in a semi-automatic manner including a supply magazine, dispensing mechanism including a cylindrical dispensing roller having a friction gripping surface and means for rotating said roller, means permitting only one disklike member to be drawn from the magazine in a single operation including a separating plate having a central discharge opening proportionately smaller than the size of the disklike member to be dispensed, a groove formed around the inner edge of said discharge opening operative to retain any disklike member not actually engaged by the dispensing roller and prevent it from being dispensed from the magazine, said dispensing roller being operative to forcibly withdraw the disklike member through the discharge opening in the separating plate.

9. Mechanism for separately dispensing sheet-like members in the form of disks, pads, gaskets and the like which includes, a supply magazine, mechanism for engaging and dispensing the lowermost disklike member contained in said magazine, means for manipulating said discharge mechanism, and means for preventing more than one sheet-like member from being dispensed at a time which includes a separating plate having a central discharge opening, said separating plate having a groove extending around the periphery of said discharge opening operative to catch the following sheet-like member and prevent its withdrawal while the dispensing mechanism operates to engage the lowermost sheet-like member through the discharge opening.

10. Means for separating sheet-like members in the form of disks, pads, gaskets and the like from a supply thereof and for preventing more than one of said supply from being drawn out of said supply at a time which includes, a separating plate provided with a central discharge opening of proportionately smaller size than the size of the sheet-like member to be separated, said separating plate having a groove extending around the inner edge of the discharge opening, withdrawing means operative to engage a surface of the lowermost sheet-like member and forcibly withdraw said lowermost sheet-like member downwardly through said discharge opening in the separating plate, said grooved opening being operative to prevent the withdrawal of the adjacent sheet-like member during the withdrawal of the lowermost member.

11. Mechanism for dispensing flexible filter disks having a natural tendency to cling one to the other which includes, a magazine adapted to accommodate a supply of the filter disks, rotatable mechanism adapted to withdraw one of said filter disks out of said magazine without marring the filter disk, said rotatable mechanism having a roughened periphery adapted to engage a surface of the adjacent filter disk, an apertured separating plate permitting the lowermost filter disk to sag therethrough, a groove formed in the periphery of said aperture, a follow-weight adapted to engage the supply of filter disks causing the sagging portion of the lowermost filter disk to engage the rotatable mechanism whereby upon rotation thereof in one direction, a filter disk is engaged and withdrawn partially through the apertured separating plate, and upon rotation of the rotatable mechanism in the opposite direction, a filter disk is completely withdrawn downwardly from the magazine through the apertured separating plate, said groove being operative to prevent withdrawal of the following filter disk until the cycle of operation of the rotatable mechanism is repeated.

EARL R. COUDEN.

References Cited in the file of this patent

UNITED STATES PATENTS

| Number | Name | Date |
|---|---|---|
| 800,072 | Churchman et al. | Sept. 19, 1905 |
| 1,587,463 | Arms | June 1, 1926 |
| 1,697,654 | Jantzen | Jan. 1, 1929 |
| 2,428,530 | Schneider | Oct. 7, 1947 |

FOREIGN PATENTS

| Number | Country | Date |
|---|---|---|
| 162,802 | Germany | Sept. 21, 1905 |